Figure 1:
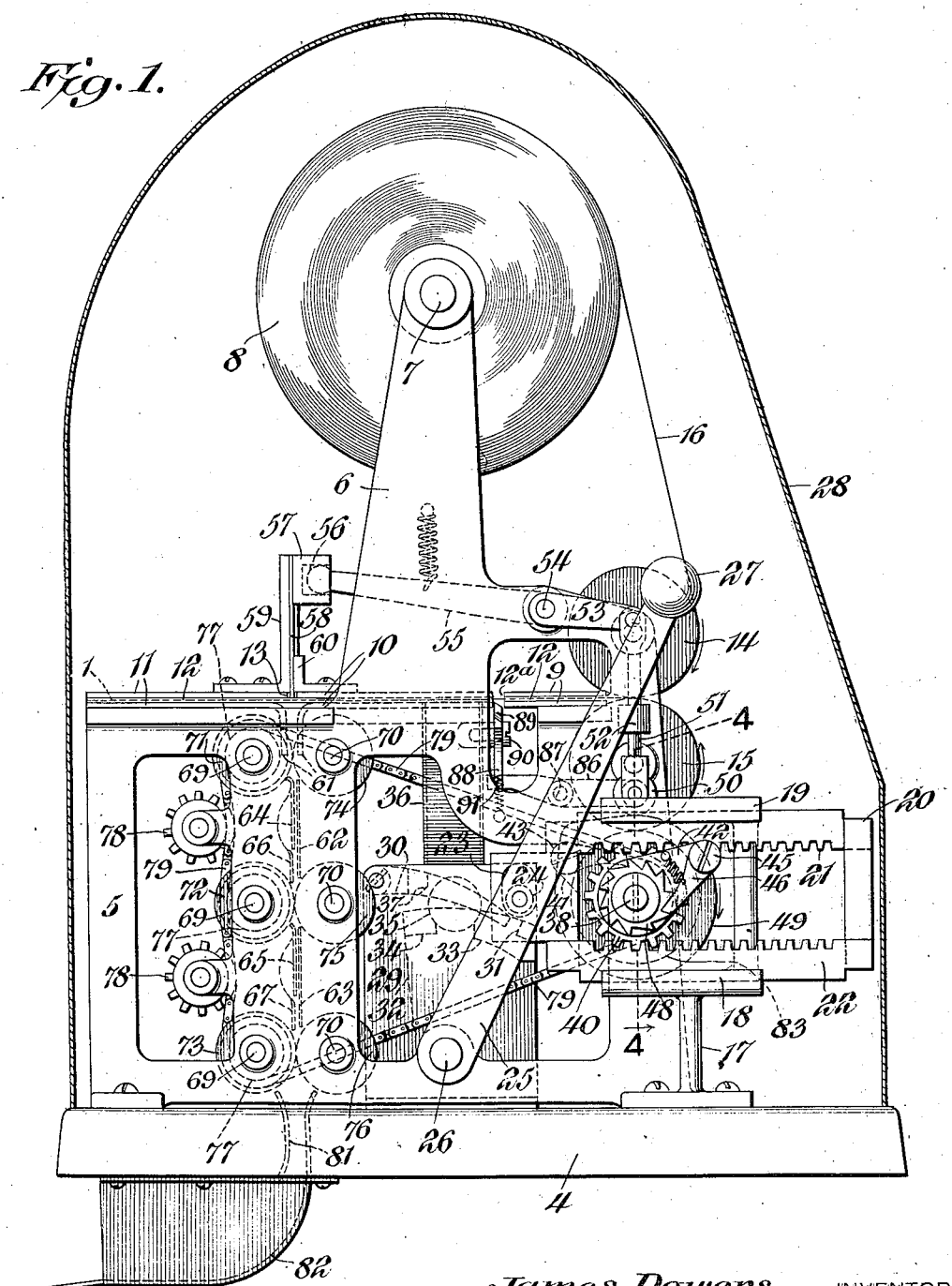

J. POWERS.
APPARATUS FOR MAKING AND VENDING SANITARY CUPS.
APPLICATION FILED APR. 4, 1912.

1,077,298.

Patented Nov. 4, 1913.
4 SHEETS—SHEET 1.

James Powers, INVENTOR,

WITNESSES
Howard D. Orr.
F. T. Chapman

BY E. G. Siggers.
ATTORNEY

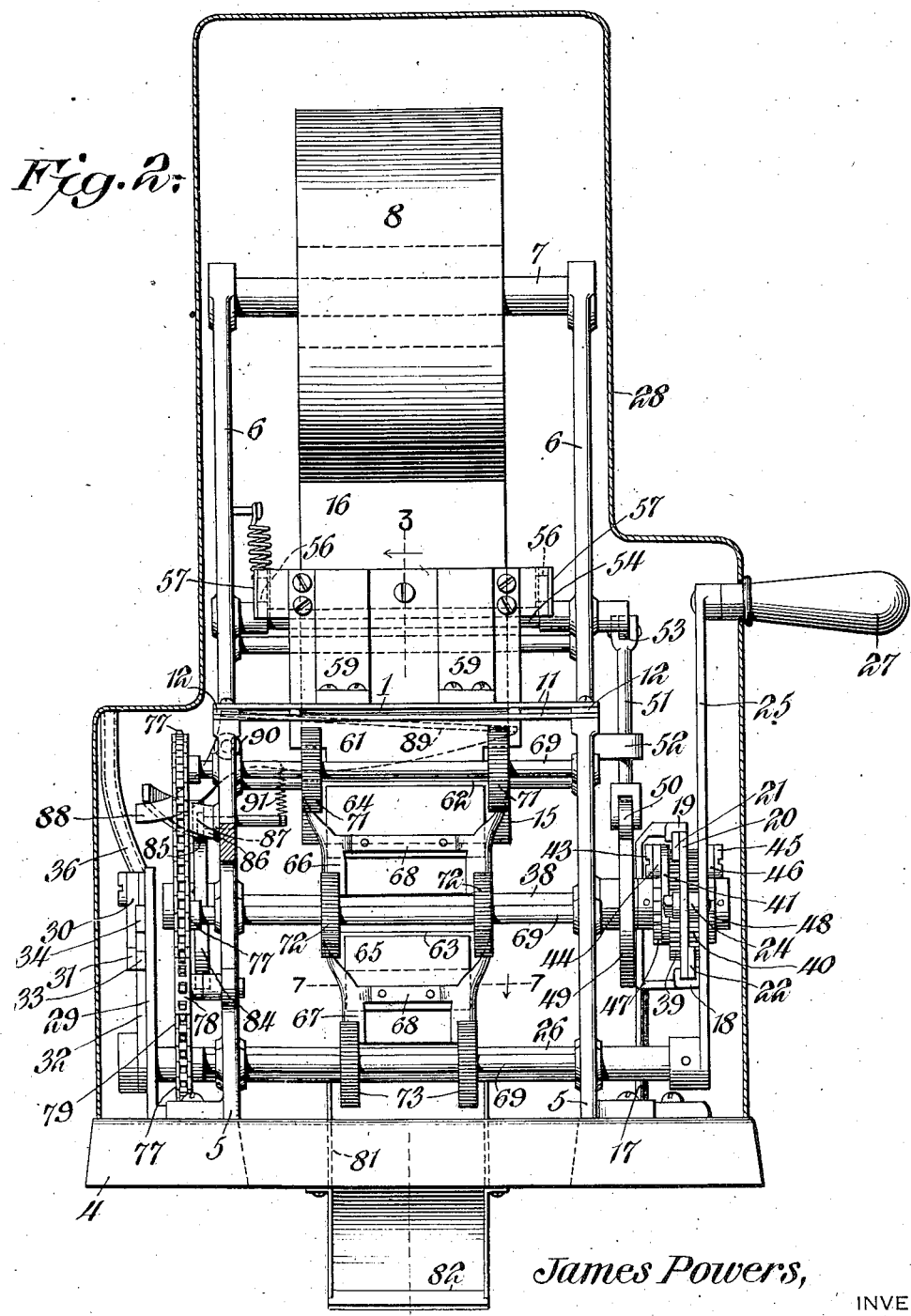

J. POWERS.
APPARATUS FOR MAKING AND VENDING SANITARY CUPS.
APPLICATION FILED APR. 4, 1912.
1,077,298.
Patented Nov. 4, 1913.
4 SHEETS—SHEET 3.
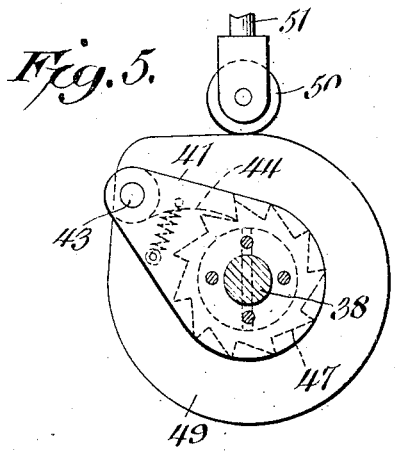
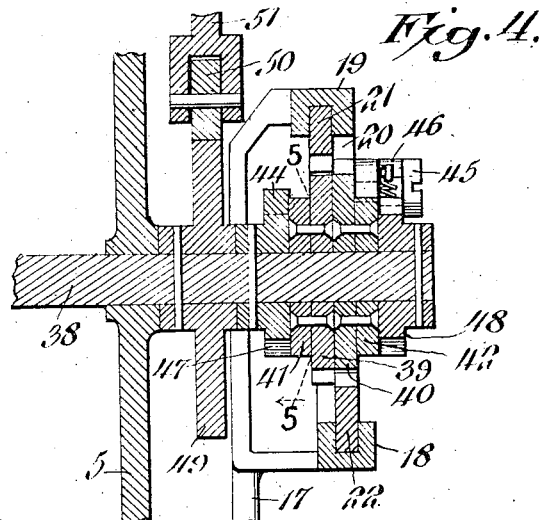
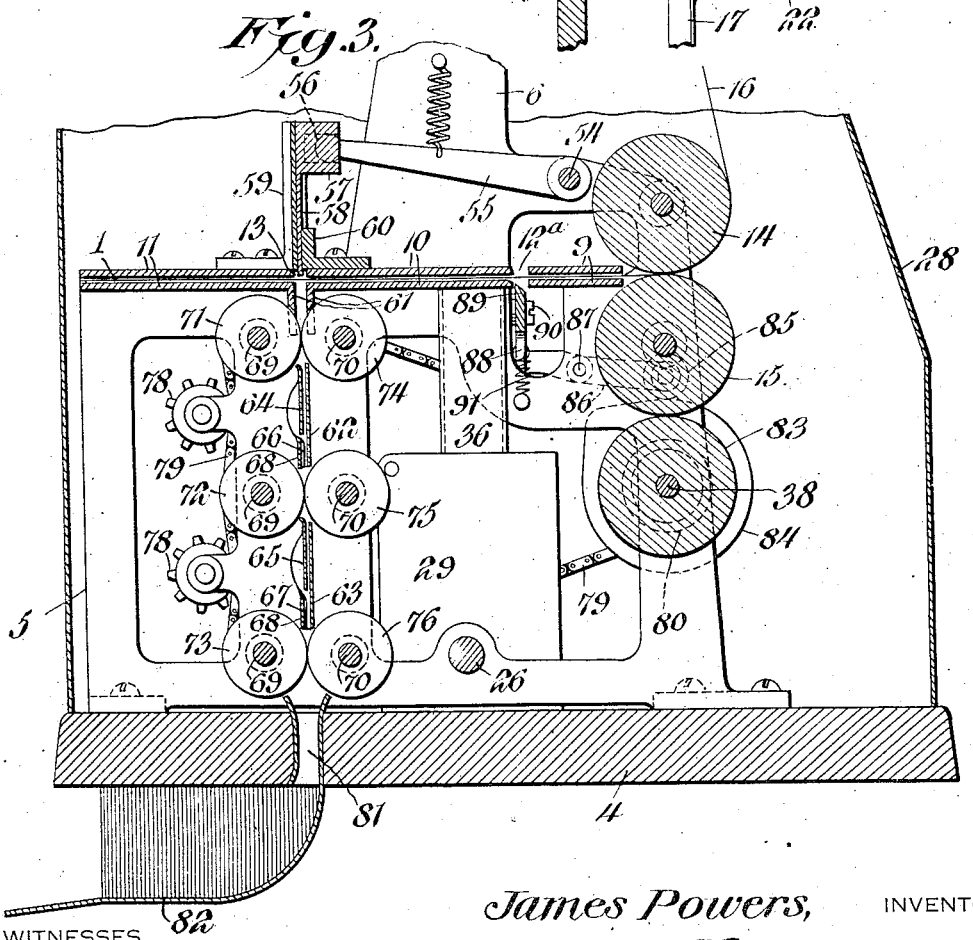
WITNESSES
Howard D. Orr.
F. J. Chapman
James Powers, INVENTOR,
BY
E. J. Siggers
ATTORNEY J. POWERS.
APPARATUS FOR MAKING AND VENDING SANITARY CUPS.
APPLICATION FILED APR. 4, 1912.

1,077,298.

Patented Nov. 4, 1913.

4 SHEETS—SHEET 4.

WITNESSES
Howard D. Orr
F. T. Chapman

James Powers, INVENTOR,
BY E. G. Siggers
ATTORNEY

UNITED STATES PATENT OFFICE.

JAMES POWERS, OF NEWARK, NEW JERSEY.

APPARATUS FOR MAKING AND VENDING SANITARY CUPS.

1,077,298.  Specification of Letters Patent.  Patented Nov. 4, 1913.

Application filed April 4, 1912.  Serial No. 688,487.

*To all whom it may concern:*

Be it known that I, JAMES POWERS, a citizen of the United States, residing at Newark, in the county of Essex and State of New Jersey, have invented a new and useful Apparatus for Making and Vending Sanitary Cups, of which the following is a specification.

This invention has reference to improvements in apparatus for making and vending sanitary cups, and its object is to provide an apparatus whereby a cup for drinking and like purposes is made and delivered by the apparatus by a single simple actuation of the apparatus by an operator, the apparatus being usually provided with a coin control after the practice prevailing in vending machines.

Many people object either from sanitary or fastidious reasons to the use of a common drinking cup or glass, especially in public or semi-public places, or wherever there is a possibility of transfer of disease from one person to another through such medium, and oftentimes persons of refined tastes object to the common use of drinking cups or glasses, even though there be no fear of contracting disease from such use. In most instances there is no cleansing of the cup or glass for long periods of time, and, again, such cleansing as may be attempted is often very imperfectly performed and many persons are forced to forego the use of various kinds of drinks by reason of the repugnance caused by lack of cleanliness.

It has been proposed to provide individual sanitary drinking cups made of some cheap material, usually paraffin paper, but such cups as heretofore provided, although contained in closed receptacles and delivered one at a time to the user, are only seemingly sanitary for it frequently happens that such cups are handled many times between their manufacture and the delivery of the cups to the individual purchasers. Such cups after coming from the machine by which they are manufactured are packed, shipped, then unpacked, then carried to the receptacle from which they are ultimately delivered to the purchaser, and many times the cups are subjected to frequent handlings by not overclean attendants, and possibly by diseased persons, so that while the fastidious person might not be shocked, because ignorant of the actual conditions, the danger of the transfer of disease is still to a marked degree present. By the present invention these objectionable features are wholly eliminated, for the cup is made complete in the vending machine or apparatus, which latter may be so inclosed as to avoid contamination, and the only part which is at all handled is a compact roll of paraffin paper which may be produced in roll form by a suitable machine free from contact with any persons, and even though it be necessary to handle the roll of paper in order to introduce it into the vending machine, the only contact by those handling the roll is with the outer surface of the roll and with the edges thereof, and by removing the outer layer of the roll after having been introduced into the machine no part of the paper so touched by the handlers, when such paper is subsequently made into cups, is exposed to contact by the purchaser so that the cups are in the true sense of the word sanitary.

In a machine constructed in accordance with the present invention the paper is drawn from the roll, cut off in a suitable length, folded, and refolded, and delivered to the purchaser in the form of a cup capable of holding water or other liquids without leaking, the water-tight condition being brought about solely by the manner of folding the cup and without the use of adhesives, the whole operation being performed by a simple movement on the part of the purchaser.

The invention will be best understood from a consideration of the following detailed description, taken in connection with the accompanying drawings forming a part of this specification, with the further understanding that while the drawings show a practical form of the invention, the latter may assume other practical forms without departure from the salient features of the invention, wherefore the invention is not confined to any strict conformity with the showing of the drawings.

Figure 7:
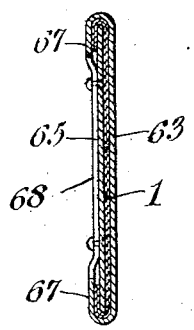
Figure 8:
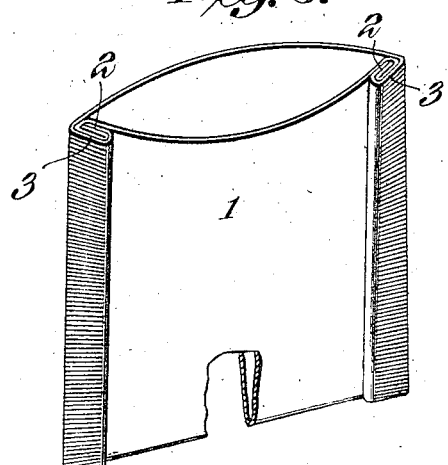
Figure 6:
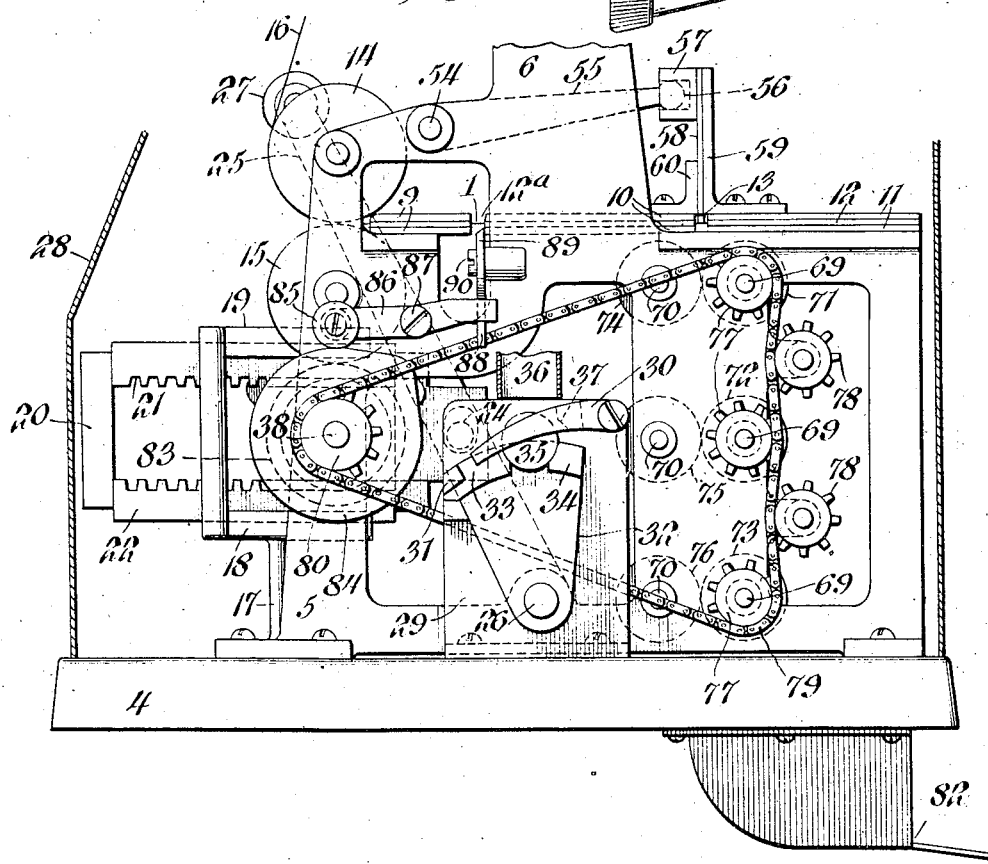

In the drawings:—Figure 1 is a side elevation of the apparatus with the casing in section to expose the interior of the structure. Fig. 2 is an elevation of the apparatus shown in Fig. 1 as viewed from the left hand end of Fig. 1, the casing being shown in section. Fig. 3 is a section on the line 3—3 of Fig. 2. Fig. 4 is a section on the line 4—4 of Fig. 1, but drawn to a larger scale. Fig. 5 is a section on the line 5—5 of Fig. 4 with distant parts omitted. Fig. 6 is an elevation of the side of the machine remote from that shown in Fig. 1 with the upper portion of the machine omitted. Fig. 7 is a section on the line 7—7 of Fig. 2 and drawn to a larger scale. Fig. 8 is a perspective view of the complete cup with the liquid receiving end expanded, the body of the cup being in part broken away and shown in section.

The device of the present invention is designed to produce drinking cups for water or other liquids, and while not confined to any particular material for the production of the cups, paraffin paper is particularly adapted for the purpose, and without confining the invention to the use of paraffin paper, the material of the cup will hereinafter be referred to as paraffin paper for convenience of description.

Before describing the apparatus, the structure of the cup itself will be briefly described with reference to Fig. 8. The cup is formed of a sheet 1 of paraffin paper, usually considerably longer than wide, and folded intermediately, so that the body of the cup is half as long as the sheet from which it is made. Each sheet 1 is cut from a suitable roll of paraffin paper to be hereinafter referred to, and after the intermediate fold is produced the edges thus brought together are folded together toward the center line of the cup, this fold being indicated at 2, and after this fold 2 is produced, another fold 3 is made, so that the first fold 2 is confined between the fold 3 and the body of the cup. Each fold as made is crimped or otherwise operated upon so that the paper layers are brought into intimate contact and in a manner embedded one in the other, the second fold housing the free edges of the first fold, while the crimping so compresses the layers together and unites the paraffin with which the paper is impregnated that these edges stick closely together, and sufficiently cohere to prevent the escape of any liquid which may be placed in the cup, the weight of the liquid being insufficient to cause separation of the folded edges to an extent permitting escape of liquid, so that the cup is for all practical purposes liquid-tight. When in use the folded edges of the cup at the open end of the latter are pressed together by the user so that the open end is expanded, wherefore the cup provides a container capable of holding as much water as is usually desired to quench the thirst if water be the liquid used, while the cup will withstand numerous fillings.

Referring now to the other figures of the drawing, there is shown a base 4 carrying side frame members 5 spaced apart a sufficient distance and shaped to support mechanisms to be described. Erected on each frame member 5 is a post or standard 6 terminating at the upper end in bearings for a shaft 7 designed to carry a roll 8 of paraffin paper of appropriate width to permit the formation of the cups 1 with their side folds 2 and 3. The roll 8 contains sufficient paper for many cups, and may be readily protected from contamination from the time it leaves the machine on which it is manufactured to the time of its introduction into the machine of the present invention, and then the only chance of contamination is at the ends of the roll, which ends are folded tightly within the side portions of the complete cup, and hence are not reached by the mouth of the user of the cup, so that should contamination by some remote chance occur, liability of danger to the user of the cup is so reduced as to be practically negligible, while all those parts of the cup exposed at all to handling are up to the time of the operation of the machine to form a cup completely protected from any chance of contamination at any time.

When the machine is in operation the base 4 is lowermost and may be considered as substantially horizontal in position, while the frame members 5 are upright and the standards 6 are in uprising relation from the top of the frame 5. Expressions of position that may be hereinafter used have reference to the machine when installed in operative condition.

Connecting the upper ends of the frame members 5 are pairs of plates 9, 10, 11, respectively, these plates being spaced apart by distance strips 12, where supported by the frame members 5, so that between the plates there is provided a shallow laterally extended passage, and the plates are so disposed that the several passages defined by the two members of each pair of plates are in alinement. The pair of plates 9 is separated from the pair of plates 10 by the short space indicated at $12^a$, and the pair of plates 10 is separated from the pair of plates 11 by a short space indicated at 13, the spaces $12^a$ and 13 extending laterally of the series of plates taken as a whole.

Mounted in suitable journal bearings in the frame members 5 are rollers 14, 15, respectively, so arranged that they may contact in line with the spaces between the plates 9, 10 and 11 adjacent those edges of the pair of plates 9 remote from the edges defining one side of the space $12^a$.

The web of paper making up the roll 8 and for convenience of description indicated in the drawings by the reference numeral 16, is introduced between the rolls 14 and 15, and from thence between the plates 9, across the space $12^a$, then between the plates 10 and across the space 13, and finally between the plates 11, terminating at the edge of the plates remote from the space 13, the paper web being then in position for operations thereon to be described.

Erected on the base 4 is a supporting member 17 carrying two opposed spaced channel members 18 and 19 between which there is mounted a frame 20 in part composed of two parallel rack bars 21, 22 with the teeth facing and spaced apart an appropriate distance. One end of the frame 20 is provided with a slot 23 in which engages a roller 24 carried by a manipulating lever 25 having at one end a pivot support 26 in one of the side members 5, while at the other end this lever is provided with a handle 27 in position to be grasped by the operator, and as the complete machine is inclosed in a suitable casing 28, the handle 27 is carried through the casing in position to be grasped by the operator, it being understood that the casing is appropriately shaped to permit movement of the lever handle through an appropriate arc about the pivot 26. The purpose of the roller connection 24 with the frame 20 is to cause a reciprocatory movement of the racks 21 and 22 when the lever 25 is rocked about its pivot in a manner and for a purpose to be described.

Erected on the base 4 is a plate 29, and pivoted at one end to this plate is a pawl 30, the free end of which is in the path of a stud or boss 31 on an arm 32 mounted on the pivot support 26, which is in the form of a rock shaft journaled in the frame members 5 and extending from one to the other and through and beyond the same, the manipulating lever 25 being made fast to one end of the shaft and the arm 32 to the other end of the shaft. The arm 32 is provided with two coacting lugs 33, 34 so spaced and shaped at their contiguous portions as to form a seat for a coin or token 35 which may be delivered to this seat by means of a chute 36 leading to the exterior of the casing 28 where provision is made for the introduction only of a coin of appropriate size and value. The pawl 30 is provided with a shoulder 37 so positioned as to be engaged by the coin 35 when on the seat formed by the lugs 33 and 34, whereupon further rocking movement of the arm 32 will cause a movement of the pawl 30 to bring its free end out of the path of the lug 31. When the coin 35 is not present a slight movement of the handle, and with it the arm 32, is permitted, since under normal conditions the free or engaging end of the pawl 30 is spaced a short distance from the lug 31, this permitting a movement of the arm 32 sufficient to carry a coin when positioned on the arm 32 into engagement with the shoulder 37 to move the pawl to carry its free end out of the path of the lug 31, so that the pawl will then no longer interfere with the full movement of the manipulating arm to cause actuation of mechanisms to be described. When the manipulating arm has reached the full limit of its movement in one direction, the coin 35 may be discharged into a suitable receptacle, which latter, however, is not shown in the drawings.

Journaled in and extending through the side members 5 of the frame is a shaft 38, and this shaft extends through the frame 20 intermediate of the rack bars 21 and 22. Mounted upon the shaft 38 so as to turn thereon are two gear wheels 39, 40 arranged side by side, and the rack bars 21 and 22 are displaced with reference one to the other in the direction of the longitudinal axis of the shaft 38, so as to mesh with respective gear wheels 39 and 40, the rack bar 21 meshing with the gear wheel 39, and the rack bar 22 with the gear wheel 40, but the rack bars are on opposite sides of the shaft 38, so that when the two rack bars are moved in one direction, and being fast to the frame 20 they move simultaneously, the gear wheels will be simultaneously rotated in opposite directions. Fast to the gear wheel 39 is an arm 41, and fast to the gear wheel 40 is an arm 42 like the arm 41, each arm extending radially with reference to the respective gear wheel. Mounted on the outer end of the arm 41 by means of a pivot screw 43 is a pawl 44, and mounted on the arm 42 by means of a pivot screw 45 is a pawl or dog 46. Adjacent the arm 41 and fast to the shaft 38 is a ratchet wheel 47, and adjacent the arm 42 and fast to the shaft 38 is a ratchet wheel 48, the ratchet wheel 47 being in position to be engaged by the pawl or dog 44, and the ratchet wheel 48 being in position to be engaged by the pawl or dog 46. The teeth of the ratchet wheels 47 and 48 are arranged in the same direction, and the arms carried by the gear wheels and the dogs carried by the arms are oppositely located with respect one to the other, so that when the gear wheels are simultaneously rotated in one direction the dog of one arm will engage a tooth of the respective ratchet wheel and rotate the shaft 38 in a like direction, while the dog carried by the other arm will ride idly over the teeth of the respective ratchet wheel and when the gear wheels are rotated in the other direction the reverse operation takes place, but in each instance the direction of rotation of the shaft 38 is the same, wherefore a reciprocatory movement of the rack bars 21 and 22 will cause a continued rotation of the shaft 38 in one direction.

Mounted on the shaft 38 adjacent the ratchet wheel 47 is a cam 49 with the periphery of which there engages a roller 50 on one end of a rod 51 capable of sliding in a bearing 52 carried by the corresponding frame member 5. The rod 51 at the end remote from the roller 50 is pivotally connected to the corresponding end of a rock arm 53 connected at the other end to one end of a rock shaft 54 journaled in a part of the supporting frame, and this shaft 54, which extends a distance equal to the space between the standards 6, carries other rock arms 55 having the free ends rounded, as indicated at 56, and lodged in bearing boxes 57 fast to a plate 58, of a width somewhat greater than the width of the web 16. This plate is mounted between upright guides 59, 60 on the respective plates 10 and 11 on opposite sides of the opening 13, and this plate is so disposed as to move through the opening 13 to an extent and for a purpose to be described.

In line with the opening 13 the lower members of the pairs of plates 10 and 11 are downturned, as indicated at 61, to form a throat into which the plate 58 is moved in a manner to be described. In line with this throat are plates 62, 63 and other matching plates 64, 65. The plates 62, 63 have inturned side edges 66, 67, respectively, in partial embracing relation to the corresponding edges of the plates 64 and 65, and these inturned edges 66 and 67 may be provided with connecting bars 68 serving as supports for the respective plates 64 and 65, which are held in spaced relation to the corresponding plates 62 and 63. The inturned portions 66 of the plate 62 are so shaped as to be closer together at the lower ends than where they start from the plate 62, and the same is true of the inturned edges 67 of the plate 63, the space between the inturned edges 67 being narrower than the corresponding space between the inturned edges 66, and the latter being closer together than the original width of the plate 62 adjacent the down-turned edges or flanges 61.

Mounted in and extending between the side members 5 of the main frame are two series of shafts 69 and 70, the shafts 69 carrying rollers 71, 72 and 73, respectively, and the shaft 70 carrying rollers 74, 75 and 76, respectively, these rollers having their peripheries milled or otherwise suitably formed and arranged to contact or approximately so. The rollers 71 and 74 constitute a pair of rollers at each side of the plate 62 adjacent the throat formed by the flanges 61. The rollers 72 and 75 constitute a pair of rollers at each side of the plate 63 where adjacent the lower end of the plate 62, and the rollers 73 and 76 constitute a pair of rollers on each side of the lower end of the plate 63. Each shaft 69 has thereon a pair of corresponding rollers, and each shaft 70 has thereon a matching pair of rollers, but the rollers of the uppermost shaft 69 are spaced wider apart than that of the intermediate shaft, and the latter are spaced farther apart than the rollers of the lowermost shaft, there being three pairs of shafts in vertical arrangement in the structure shown in the drawings. Each shaft 69 has at one end a sprocket wheel 77, and idler sprocket wheels 78 are provided upon appropriate studs carried by the corresponding frame member 5 to hold a sprocket chain 79 in engagement with the several sprocket wheels in such manner that the shafts 69 are all rotated in the same direction. The sprocket chain 79 is an endless chain and is carried about a sprocket wheel 80 mounted on the appropriate end of the shaft 38, so that when the shaft 38 is rotated the shafts 69 will participate in such rotation, and this rotative movement of the shafts 69 causes a like rotative movement of the rollers 71, 72 and 73, the movement being transmitted by contact to the rollers 74, 75 and 76.

Extending through the base 4 is an appropriate guide channel 81 opening on to a shelf 82 in position to be accessible to an operator of the apparatus.

Mounted on the shaft 38 is a roller 83 engaging the roller 15 to impart rotative movement thereto, and this roller 15 by engaging the web 16 will cause a feeding of the web in a manner to be described, the roller 14 being rotated by engagement with the web, which latter is clamped between the rollers 14 and 15, the parts being properly proportioned for the purpose.

Mounted on the shaft 38 near the end thereof remote from the cam disk 49 is another cam disk 84, in the path of which there is a roller 85 on one end of a lever 86 pivoted at 87 to the appropriate member 5 of the frame, and this lever has the end remote from the roller 85 in position to engage a finger 88 fast to a knife 89 to one side of the pivot point 90 of the knife, the latter being mounted to rock in a direction to traverse the opening or space 12ª in shearing relation to the corresponding edge of the pair of plates 10. The knife is normally held in the inactive position by a spring 91.

Let it be assumed that the web 16 has been threaded through the space between the plates 9, 10 and 11 to that end of the plates 11 remote from the passage 13. The plates 10 and 11 are of equal length, so that the passage 13 is equally spaced from the knife or cutter 89 and the end of the plates 11 remote from the space 13. Assuming further that a suitable coin has been introduced into the machine, the operator grasps the handle 27 and moves the operating lever 25 toward the left as viewed in Fig. 1. This will move the frame 20 toward the left and both gear wheels are rotated an appropriate distance by the rack bars 21 and 22, the gear wheel engaged by the rack bar 21 rotating counter-clockwise, and the gear wheel engaged by the rack bar 22 rotating clockwise as viewed in Fig. 1. The arm 42 carried by the gear wheel 40 is rotated clockwise and the dog 46, therefore, engages the teeth of the ratchet wheel 48 and the shaft 38 is also rotated clockwise, while the arm 41 carried by the gear wheel 39 is rotated in a counter-clockwise direction, wherefore the dog or pawl 44 carried by the arm connected to such gear wheel rides idly over the teeth of the corresponding ratchet wheel. As this movement begins, the cam 84 acts upon the lever 86 to rock the knife 89 in a direction to sever the web 16 at the space 12, and at the same time the cam 49 acts upon the rockshaft 54 to cause a downward movement of the blade 58 which engages the severed portion of the web intermediate of its length, the rollers 14 and 15 in the meantime feeding more web into the space between the plates 10 and 11. Moreover, the rotative movement of the shaft 38 has through the sprocket chain 79 set the several rollers 71, 72 and 73 and their counterparts 74, 75 and 76 in motion, so that the doubled sheet of paper is caught at the fold between the pairs of rolls 71 and 74 and fed into the space between the plates 62 and 64, while the curved margins or edges 66 of the plate 62 causes an overlapping or folding of these marginal portions of the folded sheet upon itself, the sides or margins of the folded sheet having first passed between the rollers 71 and 74 where the margins are pressed together and crimped by the milled edges of the rollers, so that the edges are brought into intimate contact and substantial coherence, the crimping being of a very fine character. When the folded-over crimped edges are presented to the second set of rollers 72 and 75 they are again crimped and forced between the plates 63 and 65, and the folded portions are again folded upon themselves and ultimately passed between the rollers 73 and 76 where they once more receive a crimping, whereby the double fold is compressed and all the parts are forced into substantial coherence, after which the completed cup in a flat condition is discharged through the passage 81 upon the shelf 82, where it is easily accessible to the operator. But part of this operation has taken place during the first or forward stroke of the manipulating lever, and the latter must be returned to its initial position by the operator, thus reversing the direction of movement of the rack bars 21 and 22 when the gear wheel 39 comes into operation to rotate the shaft 38, while the gear wheel 40 rotates idly, but the direction of rotation of the shaft 38 is the same as before, wherefore all the parts actuated by the shaft 38 continue to move in the same direction as before.

The several parts are suitably proportioned and timed in operation to perform their several functions, so by a single forward and a single return movement of the operating lever the strip is severed from the web, the severed strip is folded, the edges of the strip where folded together are in turn folded upon themselves, and this folded portion is once more folded upon itself to imprison the first fold, and each fold is crimped to cause an adherence of the contacting surfaces, wherefore, because of the character of the paraffin paper, there is provided a liquid-tight joint along the edges of the cup as received by the purchaser, and by forcing the sides of the cup one toward the other that portion of the cup remote from the intermediate fold is opened up and the cup is ready to receive liquid, and may be used in the usual manner.

The cup constituting the product of the machine of the present invention, as well as the method of making such cup, is not herein claimed, since the cup in itself as well as the method of making it is claimed in another application for a sanitary drinking cup and method of making the same filed by me on even date herewith.

What is claimed is:—

1. In a machine for making sanitary drinking cups, a support for a web from which the cups are to be made, feeding means for the web, severing means for the web, folding means for folding the severed portion of the web intermediately upon itself, folding means and compressing means for the meeting sides of the folded web, an inclosing means for the web supporting, severing and compressing means, and a single means accessible from the exterior of the inclosing means for imparting motion to the several web operating means in timed relation to cause the formation and delivery of a cup from a web of material within the machine.

2. In a machine for making sanitary drinking cups, a support for a web from which the cups are to be made, feeding means for the web, severing means for the web, folding means for folding the severed portion of the web intermediately upon itself, folding means and compressing means for the meeting sides of the folded web, an inclosing means for the web supporting, severing and compressing means, and a single means accessible from the exterior of the inclosing means for imparting motion to the several web operating means in timed relation to cause the formation and delivery of a cup from a web of material within the machine, the feeding means for the web having a range of movement to cause the feeding of a length of web into position to be severed from the web supply and folded into another cup on a subsequent operation of the mechanism.

3. A machine for manufacturing and delivering a drinking cup at each operation of the machine, comprising means for supporting a web of material, means for severing a blank from the web, means for folding the blank into cup form with folded over edges, means for pressing said edges into cohesive liquid-tight relation, a casing inclosing the cup forming mechanism and web support, and a single manipulating member for the web treating means accessible from the exterior of the casing.

4. In a machine of the class described, a casing, mechanisms for the complete formation of the article to be vended housed in said casing, a reciprocatory manipulating member for said mechanisms extending into said casing, and connecting means within the casing between the manipulating member and the first-named mechanisms for converting both movements of a complete reciprocation of the manipulating member into a one-way movement of said first-named mechanisms.

5. In a machine of the class described, mechanisms for the complete formation of the article to be vended, a casing for inclosing said mechanism, a one-way mechanism for causing a timed operation of the article forming mechanisms and also inclosed by the casing, manipulating means for actuating the one-way mechanism accessible to an operator at the exterior of the casing, said manipulating means being mounted for reciprocation from a position of rest to a limit of movement and then back again to the position of rest to complete the cycle of operations, and means within the casing for converting both movements of the manipulating means into a one-way movement of the article forming mechanisms substantially coextensive in time of operation with both movements of a complete reciprocation of the manipulating means.

6. In a machine for manufacturing and vending drinking cups, means for the support of a roll of fabric in web form, an elongated guide for the web, a severing means for the web movable in traversing relation to the guide, a folding blade movable in traversing relation to the guide intermediate of the portion of the web cut off by the severing means, compressing means for the edges of the folded web sections between the fold and the free ends of the folded web section, folding means for folding the compressed edge portion of the web section upon itself toward the center line of the folded web section, compressing means for the folded edges of the web section, folding means for again folding the folded compressed edges of the web section, upon itself toward the center line of the web section, and means for compressing the doubled folded edges of the web section prior to delivery of the completed cup from the machine.

7. In a machine for manufacturing and vending drinking cups, means for the support of a roll of fabric in web form, an elongated guide for the web, a severing means for the web movable in traversing relation to the guide, a folding blade movable in traversing relation to the guide intermediate of the portion of the web cut off by the severing means, compressing means for the edges of the folded web section between the fold and the free ends of the folded web section, folding means for folding each compressed edge portion of the web section upon itself toward the center line of the folded web section, compressing means for the folded edges of the web section, folding means for again folding the folded compressed edges of the web section upon itself toward the center line of the web section, and means for compressing the doubled folded edges of the web section prior to delivery of the completed cup from the machine, each compressing means for the folded sides of the initially folded web section being provided with means for indenting the portions of the web engaged thereby.

8. In a machine for manufacturing and vending drinking cups, means for the support of a roll of fabric in web form, an elongated guide for the web, a severing means for the web movable in traversing relation to the guide, a folding blade movable in traversing relation to the guide intermediate of the portion of the web cut off by the severing means, compressing means for the edges of the folded web section between the fold and the free ends of the folded web section, folding means for folding each compressed edge portion of the web section upon itself toward the center line of the folded web section, compressing means for the folded edges of the web section, folding means for again folding the folded, compressed edges of the web section upon itself toward the center line of the web section, and means for compressing the double folded edges of the web section prior to delivery of the completed cup from the machine, each compressing means for the folded sides of the initially folded web section being provided with means for indenting the portions of the web engaged thereby, and said indenting means being shaped to produce closely adjacent crimping of the folded over portions of the sides of the initially folded web section.

9. In a machine for the purpose described, a support for a web of fabric, an elongated guide for the web of fabric, means for severing the web of fabric when located in the guide, a folding means movable into engagement with the severed fabric when located in the guide, and movable transversely of the latter at a point substantially midway of the distance between the severing means and the end of the guide remote from said severing means in the direction of travel of the fabric, means for folding the intermediately folded severed portion of the web into a receptacle with one end open and the sides of like dimensions and a casing wholly inclosing the mechanisms named.

10. In a machine for the purpose described, a folding mechanism provided with means for edge engagement with a blank to be folded shaped to cause the folding over of the edges of the blank toward the center line thereof, and presser rollers related to the folding over means to engage and compress the folded over portions of the blank, said compressing rollers having milled peripheries to produce indentations in the folded over portions.

11. In a machine for the purpose described, a folding mechanism comprising a member traversable by a web of fabric, said member having a succession of edge portions shaped to fold over the edges of a web in successive folds toward the center line of the web, and a succession of feeding rollers for the web interspersed with and related to the edge folding portions of the folding mechanism and of a width to engage and compress the folded over edges only.

12. In a machine for the purpose described, a folding mechanism comprising a member traversable by a web of fabric, said member having a succession of edge portions shaped to fold over the edges of a web in successive folds toward the center line of the web, and feeding rollers for the web related to the edge folding portions of the folding mechanism to engage and compress the folded over edges, said compressing rollers being arranged on opposite faces of the web when traversing the folding mechanism and provided with milled peripheries to indent the edge folded portions of the web.

13. In a machine for the purpose described, a folding mechanism comprising plates in spaced relation to be traversed by a web, said plates being successively narrower with respect to the direction of travel of the web from the point of entrance of the web into the folding mechanism to the point of exit thereof and provided with edge turning means for folding over the edges of the web toward the center line thereof, and pairs of feeding rollers successively closer together toward the exit end of the folding mechanism and related to the edge turning portions of the folding mechanism to engage and compress the marginal portions of the web.

14. In a machine for the purpose described, a folding mechanism comprising plates in spaced relation to be traversed by a web, said plates being successively narrower with respect to the direction of travel of the web from the point of entrance of the web into the folding mechanism to the point of exit thereof and provided with edge turning means for folding over the edges of the web toward the center line thereof, and pairs of feeding rollers successively closer together toward the exit end of the folding mechanism and related to the edge turning portions of the folding mechanism to engage and compress the marginal portions of the web, the rollers having their peripheries formed to indent the marginal portions of the web where engaged thereby.

15. In a machine for the purpose described, a folding mechanism comprising plates in spaced relation to be traversed by a web, said plates being successively narrower with respect to the direction of travel of the web from the point of entrance of the web into the folding mechanism to the point of exit thereof and provided with edge turning means for folding over the edges of the web toward the center line thereof, and pairs of feeding rollers successively closer together toward the exit end of the folding mechanism and related to the edge turning portions of the folding mechanism to engage and compress the marginal portions of the web, the folding mechanism having associated therewith a device for imparting to the web an initial fold on a line transverse to the length of the web.

16. In a machine for producing sanitary drinking cups, means for folding an elongated blank of suitable material upon itself intermediately of its length, means for folding the side edges of the folded blank toward the center line thereof under a pressure to cause cohesion of the material of the blank at such folds, and means for again folding the folded side edges toward the center line of the blank to imprison the first folds between the second folds and the body of the cup.

17. In a machine for producing sanitary drinking cups, means for folding an elongated blank of suitable material upon itself intermediate of its length, means for folding the side edges of the folded blank toward the center line thereof, means for compressing the folded edges, means for again folding the folded edges toward the center line of the folded blank to imprison the first folds, and means for applying compression to the doubly folded edges, the pressure employed by the compressing means being sufficient to cause cohesion of the material employed solely by such pressure.

18. In a machine for producing sanitary drinking cups, means for folding an elongated blank of suitable material upon itself intermediate of its length, means for compressing the edges of the folded blank together, means for folding the compressed side edges of the folded blank toward the center line thereof, means for compressing the folded edges, means for again folding the folded side edges toward the center line of the folded blank to imprison the first fold, and means for again compressing the doubly folded edges.

19. In a machine for producing sanitary drinking cups, means for folding an elongated blank of suitable material upon itself intermediate of its length, means for compressing the edges of the folded blank together, means for folding the compressed side edges of the folded blank toward the center line thereof, means for compressing the folded edges, means for again folding the folded side edges toward the center line of the folded blank to imprison the first folds, and means for again compressing the doubled folded edges, the compressing means being each provided with means for indenting the material of the blank where engaged thereby.

20. In a machine for producing sanitary drinking cups, means for carrying a web of waterproofed paper, means for cutting elongated blanks from said web, means for folding each blank intermediately upon itself, means for folding the side edges of the intermediately folded blank toward the center line thereof and for compressing the folded edges into cohesive relation, an inclosing casing for the web and the severing and folding means, and means accessible at the exterior of the casing for actuating the mechanisms acting upon the web and blank severed therefrom.

21. In a machine for producing sanitary drinking cups, means for folding a sheet of waterproof paper intermediately on itself, means for folding the side edges of the sheet toward the center line thereof, and means for applying compressive force to the side edges of the sheet both before and after folding the same.

22. In a machine for producing sanitary drinking cups, means for folding a sheet of waterproof paper intermediately on itself, means for folding the side edges of the sheet toward the center line thereof, and means for applying compressive force to the side edges of the sheet both before and after folding the same, said compressing means being shaped to produce indentations in the material of the sheet where engaged thereby.

In testimony, that I claim the foregoing as my own, I have hereto affixed my signature in the presence of two witnesses.

JAMES POWERS.

Witnesses:
HARRY B. ANNIN,
THOMAS L. SHANGER.